United States Patent
Deguchi et al.

(10) Patent No.: US 11,182,605 B2
(45) Date of Patent: Nov. 23, 2021

(54) SEARCH DEVICE, SEARCH METHOD, SEARCH PROGRAM, AND RECORDING MEDIUM

(71) Applicants: TOYOTA MAPMASTER INCORPORATED, Nagoya (JP); TOYOTA JIDOSHA KABUSHIKI KAISHA, Toyota (JP)

(72) Inventors: Satoru Deguchi, Nagoya (JP); Kenta Nakanishi, Nagoya (JP); Xin Jin, Toyota (JP)

(73) Assignees: Toyota Mapmaster Incorporated, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 64 days.

(21) Appl. No.: 16/532,762

(22) Filed: Aug. 6, 2019

(65) Prior Publication Data
US 2020/0143159 A1    May 7, 2020

(30) Foreign Application Priority Data
Nov. 2, 2018 (JP) .............................. JP2018-207689

(51) Int. Cl.
*G06K 9/00* (2006.01)
*G06N 20/00* (2019.01)
(Continued)

(52) U.S. Cl.
CPC ......... *G06K 9/00463* (2013.01); *G06K 9/325* (2013.01); *G06K 9/481* (2013.01); *G06N 20/00* (2019.01)

(58) Field of Classification Search
CPC .... G06K 9/00463; G06K 9/325; G06K 9/481; G06N 20/00
See application file for complete search history.

(56) References Cited

U.S. PATENT DOCUMENTS

2020/0081908 A1* 3/2020 Huang .................. G06N 3/084

FOREIGN PATENT DOCUMENTS

| JP | 2012-173809 A | | 9/2012 |
|---|---|---|---|
| JP | 2012173809 A | * | 9/2012 |

(Continued)

OTHER PUBLICATIONS

Notice of Reasons for Refusal dated Sep. 1, 2020, of counterpart Japanese Application No. 2018-207689, along with an English translation.

*Primary Examiner* — Ping Y Hsieh
*Assistant Examiner* — Xiao Liu
(74) *Attorney, Agent, or Firm* — DLA Piper LLP (US)

(57) ABSTRACT

A search device identifies names of POI from a document group having not been determined. A storage unit that stores a POI presence/absence learning model having learned contexts relating to presence/absence of POI, a POI state learning model having learned contexts relating to states of POI, and a POI name learning model having learned features relating to names of POI, an acceptance unit that accepts a first document group that is a determination target, first and second determination units and an identifying unit that identifies a name of a POI using the POI name learning model from each document of a third document group for which information relating to states of POI is determined by the second determination unit in a second document group are included.

22 Claims, 8 Drawing Sheets

(51) Int. Cl.
   *G06K 9/32*      (2006.01)
   *G06K 9/48*      (2006.01)

(56) References Cited

FOREIGN PATENT DOCUMENTS

| | | |
|---|---|---|
| JP | 2013-97758 A | 5/2013 |
| JP | 2016-024545 A | 2/2016 |
| JP | 2017-91436 A | 5/2017 |
| JP | 2018-055346 A | 4/2018 |
| JP | 2018055346 A * | 4/2018 |

* cited by examiner

SEARCH DEVICE, SEARCH METHOD, SEARCH PROGRAM, AND RECORDING MEDIUM

TECHNICAL FIELD

This disclosure relates to a search device, a search method, a search program, and a recording medium having the program stored thereon that are capable of acquiring names of POI (point(s) of interest) from various kinds of information.

BACKGROUND

Conventionally, information of various POI is listed on a map used in a navigation system in performing navigation of a vehicle. Generally, such information of POI, basically, is input by an operator who generates a navigation system. However, the operation is complicated. For this reason, in Japanese Unexamined Patent Application Publication No. 2013-097758, a technology of newly registering facility data using posted data when the posted data posted to a social networking service is for a facility different from a plurality of facilities stored in advance is disclosed. In addition, in Japanese Unexamined Patent Application Publication No. 2017-091436, a technology that selects feature words representing features of places such as facilities from a microblog posted by respective users is disclosed.

However, in Japanese Unexamined Patent Application Publication No. 2013-097758 and Japanese Unexamined Patent Application Publication No. 2017-091436, in identifying names of POI, there is a problem in that the accuracy of identification is insufficient. In addition, in automatically extracting specific expressions of a specific field, specific expressions change day by day in various fields and, accordingly, extraction of information after generation of dictionaries specialized for various fields is not realistic.

Thus, it could be helpful to provide a search device, a search method, and a search program capable of retrieving target information with an accuracy higher than in conventional approaches.

SUMMARY

We provide a search device including: a storage unit that stores a POI presence/absence learning model having learned contexts relating to presence/absence of POI, a POI state learning model having learned contexts relating to states of POI, and a POI name learning model having learned features relating to names of POI; an acceptance unit that accepts a first document group that is a determination target; a first determination unit that determines presence/absence of information relating to POI using the POI presence/absence learning model for each document of the first document group; a second determination unit that determines information relating to states of POI using the POI state learning model for each document of a second document group for which it is determined by the first determination unit that a POI is present in the first document group; and an identifying unit that identifies a name of a POI using the POI name learning model from each document of a third document group for which information relating to states of POI is determined by the second determination unit in the second document group.

We also provide a search method executed using a computer able to access a storage unit storing a POI presence/absence learning model having learned contexts relating to presence/absence of POI, a POI state learning model having learned contexts relating to states of POI, and a POI name learning model having learned features relating to names of POI, the search method including: an accepting step of accepting a first document group that is a determination target; a first determination step of determining presence/absence of information relating to POI using the POI presence/absence learning model for each document of the first document group; a second determination step of determining information relating to states of POI using the POI state learning model for each document of a second document group for which it is determined in the first determination step that a POI is present in the first document group; and an identifying step of identifying a name of a POI using the POI name learning model from each document of a third document group for which information relating to states of POI is determined in the second determination step in the second document group.

We further provide a search program causing a computer able to access a storage function of storing a POI presence/absence learning model having learned contexts relating to presence/absence of POI, a POI state learning model having learned contexts relating to states of POI, and a POI name learning model having learned features relating to names of POI to execute: an acceptance function of accepting a first document group that is a determination target; a first determination function of determining presence/absence of information relating to POI using the POI presence/absence learning model for each document of the first document group; a second determination function of determining information relating to states of POI using the POI state learning model for each document of a second document group for which it is determined by the first determination function that a POI is present in the first document group; and an identifying function of identifying a name of a POI using the POI name learning model from each document of a third document group for which information relating to states of POI is determined by the second determination function in the second document group.

In the search device described above, the POI presence/absence learning model may be generated on the basis of a word feature vector model generated from documents used to learn features of words and a plurality of document groups for which the presence/absence of POI has been determined.

In the search device described above, the POI presence/absence learning model may be a model having learned determination of presence/absence of POI using a predetermined algorithm on the basis of feature vectors of documents extracted from a plurality of document groups for which presence/absence of POI has been determined and feature vectors represented in the word feature vector model.

In the search device described above, the POI state learning model may be generated on the basis of the word feature vector model and a plurality of document groups for which information relating to states of POI has been determined.

In the search device described above, the POI state learning model may be a model having learned determination of information relating to states of POI using a predetermined algorithm on the basis of feature vectors of documents extracted from a plurality of document groups for which the information relating to states of POI has been determined and feature vectors represented in the word feature vector model.

In the search device described above, the POI name learning model may be generated on the basis of the word feature vector model and a plurality of document groups for which names of POI have been identified.

In the search device described above, the POI name learning model may be a model having learned identification of names of POI using a predetermined algorithm on the basis of feature vectors of documents extracted from a plurality of document groups for which names of POI have been determined and feature vectors represented in the word feature vector model.

Our search device can identify names of POI with an accuracy higher than that of a conventional device.

Figure 1:
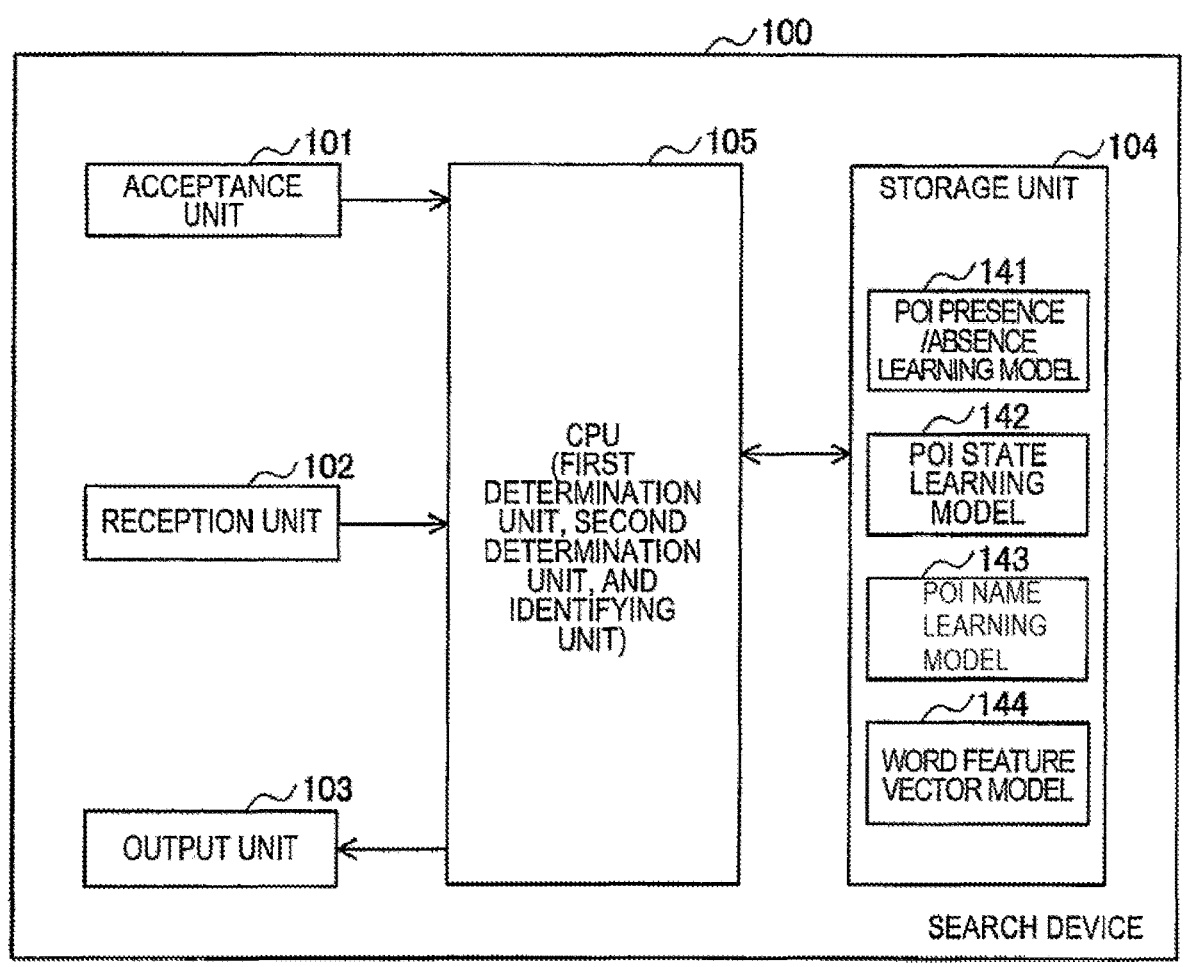
FIG. 1 is a block diagram illustrating a functional configuration example of a search device.

REFERENCE SIGNS LIST 100 search device
101 acceptance unit
102 reception unit
103 output unit
104 storage unit
105 CPU (first determination unit, second determination unit, identifying unit, and learning unit)

DETAILED DESCRIPTION

Hereinafter, our search devices, methods, programs and recording media will be described in detail with reference to the drawings.

EXAMPLE

Configuration of Search Device

Our search device includes, as illustrated in FIG. 1: a storage unit 104 that stores a POI presence/absence learning model 141 having learned contexts relating to presence/absence of POI, a POI state learning model 142 having learned contexts relating to a POI state, and a POI name learning model 143 having learned features relating to names of POI; an acceptance unit 101 and 102 that accepts a first document group of a determination target; a first determination unit 105 that determines presence/absence of information relating to POI using the POI presence/absence learning model for each document of the first document group; a second determination unit 105 that determines information relating to a POI state using the POI state learning model for each document of a second document group in which POI are determined to be present by the first determination unit in the first document group; and an identifying unit 105 that identifies names of POI using the POI name learning model from each document of a third document group of which information relating to the POI state has been determined by the second determination unit in the second document group.

Point(s) of interest (POI) may represent places, facilities and the like in which a user is assumed to be interested.

FIG. 1 is a block diagram illustrating a functional configuration example of a search device 100. As illustrated in FIG. 1, the search device 100 includes an acceptance unit 101, a reception unit 102, an output unit 103, a storage unit 104, and a CPU 105.

The search device 100 acquires information relating to names of various POI included in a map used by a navigation system from various kinds of document information as one example. Since the search device 100 acquires the names of POI, an operator does not need to do a search for POI to be registered in map information and, accordingly, the processing of the operator decreases. Hereinafter, each functional unit of the search device 100 will be described in detail.

The acceptance unit 101 has a function of accepting an input from a user using the search device 100 and transmitting the input to the CPU 105. The acceptance unit 101, for example, can be realized by hardware keys, soft keys such as touch keys or the like included in the search device 100. For example, the acceptance unit 101 accepts an input of document information that is a target to determine whether or not POI are included therein from an operator. The acceptance unit 101 transmits document information representing details of the accepted input to the CPU 105. Here, the input to the acceptance unit 101 may be an input using speech. In an input using speech, for example, an operator may input a document including information of POI by reading the document.

The reception unit 102 is a communication interface having a function of receiving information from other devices through communication. The reception unit 102 receives various kinds of documents from external devices. The reception unit 102 transmits various kinds of information that have been received to the CPU 105. As various kinds of information received by the reception unit 102, there may be document data of a document used to learn feature vectors of words, a document for which presence/absence of POI has been determined, a document for which a state of POI has been determined, a document for which names of POI have been determined, a document that is a target to determine names of POI and the like.

The acceptance unit 101 and the reception unit 102 function as an acceptance unit that accepts an input of a document group (first document group) that is a determination target.

A document used to learn feature vectors of words is information that is a source when features of various words are formed as vectors and, for example, may be a document included in Wikipedia or various electronic dictionaries.

A document for which the presence/absence of POI has been determined is a document for which it has been determined whether or not POI are present by a person (for example, an operator) who has read the document and is information including details of the document and information (may be referred to as a label, a flag or the like) representing whether or not POI are present. A document for which the presence/absence of POI has been determined includes both a document for which it is determined that description relating to POI is present and a document for which it is determined that description of POI is not present. For example, a document of "An XX store has opened after renovation in Tokyo" is a document including POI, and a document of "YY who is a Judo player has won a gold medal!" is a document not including POI.

A document for which a state of POI has been determined is a document for which whether or not there is a description relating to a state of POI and the state when there is the description have been determined by a person (for example, an operator) who has read the document and is information including details of the document and information representing that the state of POI has been determined (may be referred to as a label, a flag or the like; information representing the presence/absence of description relating to a state and the state). A document for which a state of POI has been determined may include a document for which it is determined that there is no description relating to a state of POI. In addition, a state of POI represents a state relating to the POI and, for example, represents details such as newly-opening, open, opening after renovation, relocation, closed shop. In a document of "An XX store has opened after renovation in Tokyo" described above, the document is determined as a document including a state of "opening", and information of "opening" is labeled.

A document for which names of POI have been determined is a document for which whether or not there are names of POI and the names when there are the names are determined by a person (for example, an operator) who has read the document and is information including details of the document and information representing that the names of POI have been determined (may be referred also as a label, a flag or the like; information representing the presence/absence of description relating to names and the names). A document for which names of POI have been determined may include a document for which it is determined that there is no description relating to a name of POI. In a document of "An XX store has opened after renovation in Tokyo" described above, "XX store" is determined as a name of POI.

The output unit 103 has a function of outputting directed data in accordance with a direction from the CPU 105. The output unit 103 functions as a communication interface that outputs information designated from the CPU 105 to an external device. The output unit 103, for example, can output data to external devices such as a monitor and a speaker. The output unit 103, for example, outputs information representing a name of POI found from a document by the CPU 105.

The storage unit 104 is a recording medium storing various kinds of data including various programs and map information required for the search device 100 to operate. The storage unit 104, for example, is realized by a hard disc drive (HDD), a solid state drive (SSD) or the like. The storage unit 104 stores a POI presence/absence learning model 141, a POI state learning model 142, a POI name learning model 143, and a word feature vector model 144. Such models may be stored in the storage unit 104 in advance, or models acquired by the search device 100 as results of learning may be stored.

The POI presence/absence learning model 141 is acquired by learning (machine learning or deep learning) whether or not information of POI is included in a document and is a model that accepts an input of document data for which it is not determined whether or not POI is included and determining whether or not a POI is included in the document. The POI presence/absence learning model 141 may be regarded as information acquired by digitalizing a feature of a context relating to presence/absence of a POI.

The POI state learning model 142 is acquired by learning (machine learning or deep learning) whether or not a state of a POI is included in a document and the state and is a model that accepts an input of document data for which a state of a POI has not been determined and determining whether or not there is information representing a state of a POI in the document and when there is the information. The POI state learning model 142 may be regarded also as information acquired by digitalizing a feature of a context relating to a state of a POI.

The POI name learning model 143 is acquired by learning (machine learning or deep learning) whether or not a name of a POI is included in a document and the name and is a model that accepts an input of document data for which a name of a POI has not been determined and determining whether or not a name of a POI is included in the document and the name when a name is included. The POI name learning model 143 may be regarded also as information acquiring by digitalizing a feature relating to a name of a POI in units of words.

The word feature vector model 144 is information representing features of various words. The word feature vector model 144 is information acquired by digitalizing a way in which a word is used.

The CPU 105 is a processor that executes a process to be executed by the search device 100 using various programs and various kinds of data stored in the storage unit 104.

The CPU 105 functions as a first determination unit that determines the presence/absence of information relating to a POI using the POI presence/absence learning model 141 for a document (first document group) that is a determination target accepted by the acceptance unit 101 or the reception unit 102 as an input.

In addition, the CPU 105 functions as a second determination unit that determines information relating to a state of a POI using the POI state learning model 142 for a second document group assumed to include the information relating to the POI in the first document group as an input.

The CPU 105 functions as an identifying unit that identifies a name of a POI using the POI name learning model 143 for a third document group for which information relating to a state of a POI has been determined in the second document group as an input.

Furthermore, the CPU 105 may function as a learning unit used to generate various learning models.

The CPU 105 can generate a POI presence/absence learning model 141 in which features of contexts relating to the presence/absence of POI are digitalized through learning using a document data group for which the presence/absence of POI has already been determined as an input. The CPU 105 stores the learned POI presence/absence learning model 141 in the storage unit 104.

The CPU 105 can generate a POI state learning model 142 in which features of contexts relating to states of POI are digitalized through learning using a document data group for which states of POI have already been determined as an input. The CPU 105 stores the learned POI presence/absence learning model 141 in the storage unit 104.

The CPU 105 can generate a POI name learning model 143 in which features relating to names of POI are digitalized using a document data group for which names of POI have already been determined as an input through learning. The CPU 105 stores the learned POI name learning model 143 in the storage unit 104.

The CPU 105 can generate a word feature vector model 144 in which a way in which a word is used inside a document is digitalized for each word using a document data group used for learning feature vectors of words as an input through learning. The CPU 105 stores the learned word feature vector model 144 in the storage unit 104. As document data used for learning feature vectors of words, for example, descriptions in Wikipedia, an electronic dictionary or the like can be used.

Figure 2:
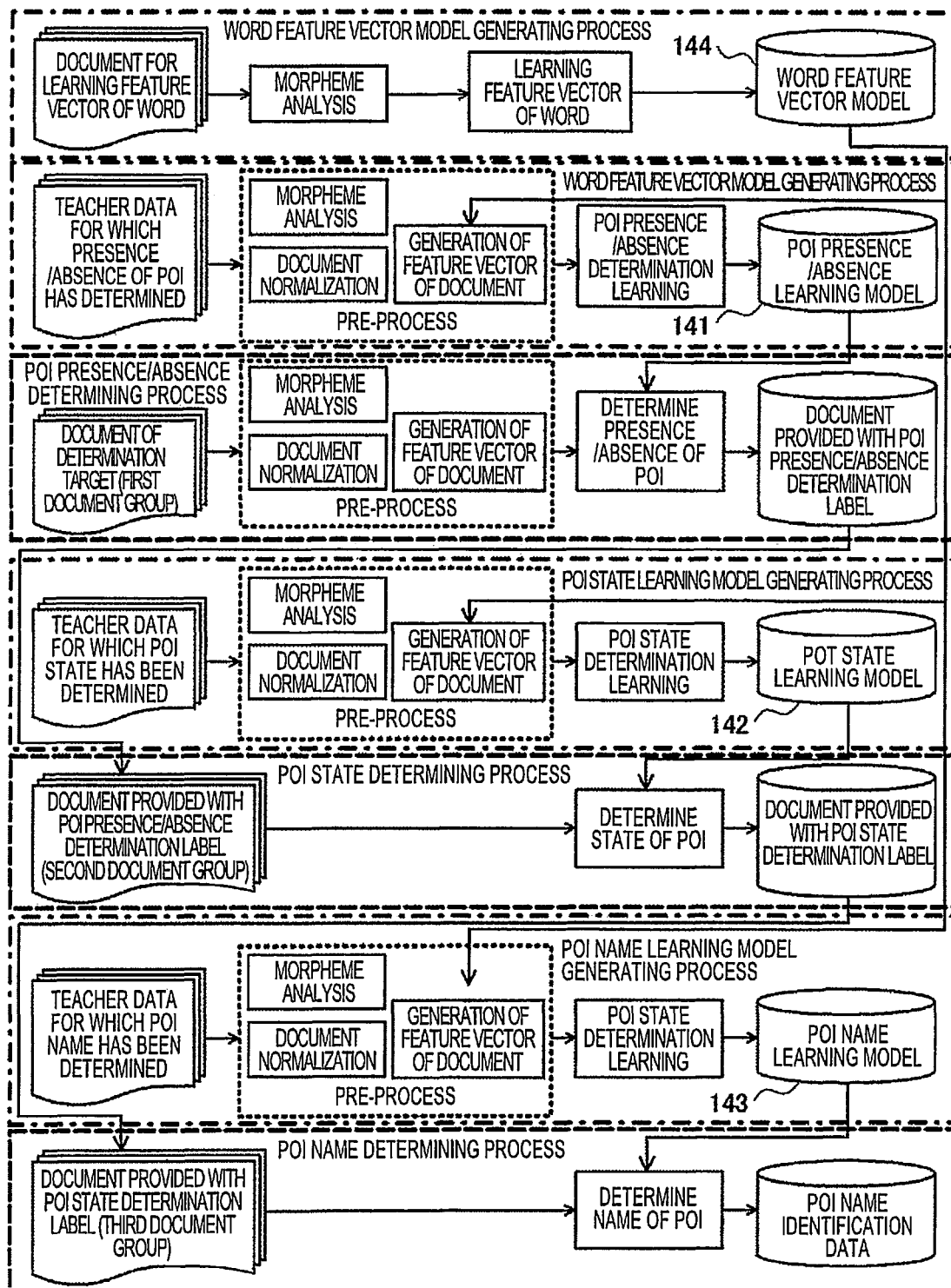
FIG. 2 is an image diagram illustrating the process of a search and learning using a search device.

A configuration example of the search device 100 has been described as above. Image of learning and determining using search device FIG. 2 is an image diagram illustrating processes of learning using the search device 100 and determination using results of learning and a method in which a learned model is used. In FIG. 2, a process within a range enclosed by dashed lines corresponds to the determination process, and a process within an area surrounded by dot-dashed lines corresponds to the learning process. In addition, a process within an area enclosed by dotted lines corresponds to a pre-process in the learning process.

As illustrated in FIG. 2, a word feature vector model 144 can be generated by performing a morpheme analysis for an input of a document for learning feature vectors of words and learning feature vectors of the words. As illustrated in FIG. 2, the word feature vector model 144 is used also in any one of stages of learning presence/absence of POI, learning a state of POI, and learning names of POI. As a document for learning feature vectors of words, for example, information of an electronic dictionary, Wikipedia on a network or the like can be used.

In addition, the search device 100 can generate a POI presence/absence learning model 141 by learning the presence/absence of POI after performing pre-processes of a morpheme analysis, document normalization, and generation of feature vectors of a document for teacher data for which the presence/absence of POI has been determined. As illustrated in FIG. 2, the POI presence/absence learning model 141 is used when a POI presence/absence determining process is performed. The teacher data for which presence/absence of POI has been determined is information in which it has been manually determined whether or not information relating to POI is included in the document.

In addition, the search device 100 can generate a POI state learning model 142 by learning a state of POI after performing pre-processes of a morpheme analysis, normalization of document, and generation of feature vectors of the document. As illustrated in FIG. 2, the POI state learning model 142 is used when a POI state determining process is performed. Teacher data for which a state of POI has been determined is information in which it has already been manually determined whether or not information relating to a state of POI is included in the document and is information in which information representing the state is labeled. A state of POI is status information (may be also referred to as tag information) enabling identification of the state of POI and, for example, information of "opening", "moving", "temporary closing", "closing", "shutdown" and "being renovated" correspond thereto, and such information is labeled.

In addition, the search device 100 can generate a POI name learning model 143 by learning names of POI after performing pre-processes of a morpheme analysis, document normalization, and generation of feature vectors of a document for teacher data for which names of POI have been determined. As illustrated in FIG. 2, the POI name learning model 143 is used when a POI name determining process is performed. The teacher data for which names of POI have been determined is information in which names of POI have already been identified for the document and is information in which the document and the identified names of POI are represented.

When names of POI are identified, as illustrated in FIG. 2, the search device 100 accepts an input of a document (first document group) that is a determination target and, first, determines whether or not each document of the first document group relates to a POI using the POI presence/absence learning model 141. Thus, a document provided with a POI presence/absence determination label is acquired as a result of the determination.

Next, the search device 100 determines a state of POI of a document group (a second document group) for which it is determined that a POI is present in the presence/absence of POI in the document (first document group) that is a determination target using the POI state learning model 142. The state of POI is determined, and a document (third document group) provided with a POI state determination label acquired by assigning the state as a label is formed.

Then, after screening of two stages is applied, the search device 100 performs a process of identifying a name of a target POI. As illustrated in FIG. 2, the search device 100 determines a name of a POI using the POI name learning model 143 from the document (third document group) provided with the POI state determination label. Then, the name of the POI acquired as a result of the determination is stored in the storage unit 104 as POI name identification data.

In this way, an operator of the search device 100 can identify the name of the POI without reading all the targets (first document group) and, accordingly, may only determine whether or not the identified name of the POI is registered in map information in the remaining processes. In addition, it is apparent that the search device 100 may register a POI represented by the POI name identification data on map information. At that time, information for the determined state may be also registered in association therewith as tag information.

Hereinafter, each process will be described in detail.
Operation of the Search Device FIG. 3 is a flowchart illustrating the flow of a process of generating the word feature vector model 144 using the search device 100.

Figure 3:
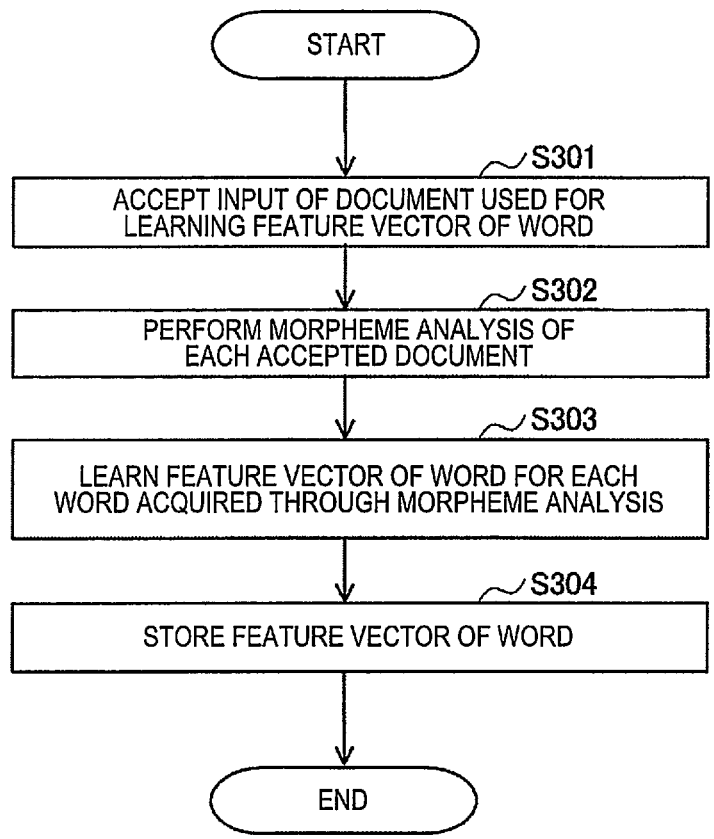
FIG. 3 is a flowchart illustrating a process of generating a word feature vector model.

As illustrated in FIG. 3, the reception unit 102 of the search device 100 receives document data (for example, data of Wikipedia or an electronic dictionary) used to learn a feature vector of a word, in other words, accepts an input of document data (Step S301). The reception unit 102 transmits the accepted document data to the CPU 105.

The CPU 105 performs a morpheme analysis of each transmitted document and decomposes the document into morphemes (elements) (Step S302).

The CPU 105 learns a feature vector of a word for each word acquired through a morpheme analysis (Step S303). In this learning, a fast text can be used as one example. The fast text is a library (neural network) used for machine learning supporting formation of a word as a vector and text classification. The fast text is merely one example, and learning may be performed using any other technique.

Then, the CPU 105 generates a word feature vector model 144 in which a way in which a word acquired through learning is used is in a digitalized state and stores the generated word feature vector model in the storage unit 104 (Step S304).

A description relating to the process of learning (generating) the word feature vector model 144 has been presented as above.

Figure 4:
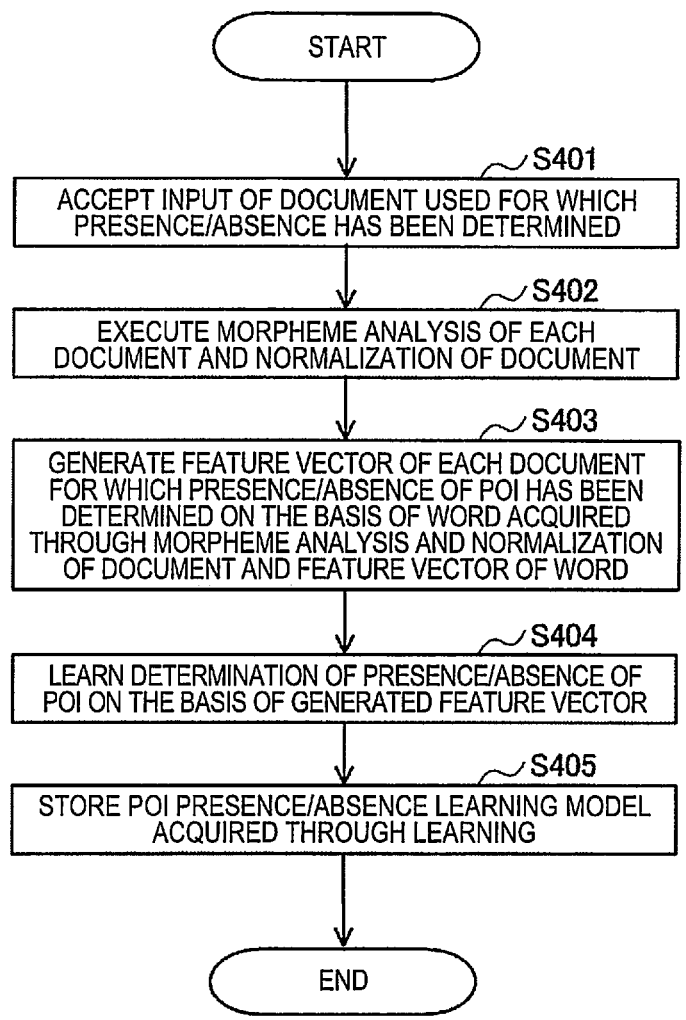
FIG. 4 is a flowchart illustrating a process of generating a POI presence/absence learning model.

FIG. 4 is a flowchart illustrating the flow of a process of generating the POI presence/absence learning model 141 using the search device 100.

The reception unit 102 of the search device 100 receives a document for which the presence/absence of POI has been determined, in other words, accepts an input of teacher data for which presence/absence of POI has been determined (Step S401). The reception unit 102 transmits the received document to the CPU 105.

The CPU 105 executes a morpheme analysis and normalization of a document for the document for which the presence/absence of POI has been determined (Step S402). The morpheme analysis decomposes a document into morphemes (elements) by analyzing the document, and the normalization of a document is a correction of a way (variations in expressions) in which a word is used within a document (or recognition of a word having variations as the same word) or shaping the way into a form that is appropriate for generation of a feature vector of the document.

The CPU 105 generates a feature vector of each document for which the presence/absence of POI has been determined using words acquired through the morpheme analysis and the normalization of the document and the word feature vector model 144 (Step S403). The CPU 105 can generate a feature vector of each document for which the presence/absence of POI has been determined using a fast text.

Then, the CPU learns a determination of the presence/absence of POI using the generated feature vectors (Step S404). Determination of the presence/absence of POI, for example, can be performed using a random forest.

The random forest is one type of algorithm of machine learning and generates a model that determines a number set in advance from a combination of randomly sampled teacher data (for example, 1,000 different types). The random forest is a learning model that acquires a final determination result through decision by a majority of determination results using all the generated models for determination when determination is performed. Accordingly, the random forest also can output a determination result for a document with a probability from each learning (determination) model. For example, when there are 880 models that have determined that information of POI is included out of 1000 models, it may be determined that information of POI is included, or it may be determined that the possibility (likelihood) of information of POI being included is 88%.

Accordingly, in Step S404, a predetermined number of feature vectors are randomly selected from among the feature vectors generated in Step S403, and a model is generated. Then, a predetermined number (for example, 1000) models that have been generated are set as learning models (the POI presence/absence learning model 141).

The CPU 105 stores the POI presence/absence learning model 141 acquired through the learning in the storage unit 104 (Step S405).

A description relating to the process of the POI presence/absence learning model 141 has been presented as above.

Figure 5:
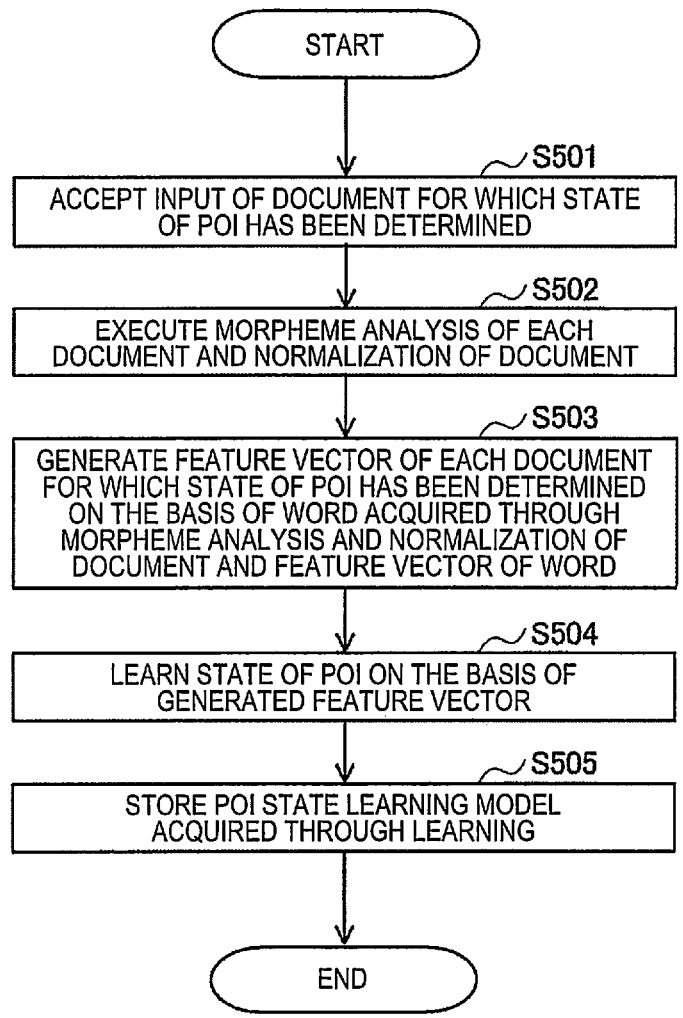
FIG. 5 is a flowchart illustrating a process of generating a POI state learning model.

FIG. 5 is a flowchart illustrating the flow of a process of generating a POI state learning model 142 using the search device 100.

The reception unit 102 of the search device 100 receives documents for which states of POI have been determined, in other words, accepts inputs of teacher data for which states of POI have been determined (Step S501). The reception unit 102 transmits the received document to the CPU 105.

The CPU 105 executes a morpheme analysis and normalization of a document for the delivered document (Step S502).

The CPU 105 generates a feature vector of each document for which a state of POI has been determined using words acquired through the morpheme analysis and the normalization of the document and the word feature vector model 144 (Step S503). The CPU 105, for example, can generate a feature vector of each document for which a state of POI has been determined using a fast text.

The CPU 105 learns a determination of states of POI using the generated feature vectors (Step S504). The learning of a determination of states of POI, for example, can be performed using a random forest.

The CPU 105 stores the POI state learning model 142 acquired through the learning in the storage unit 104 (Step S505), and the process ends.

Figure 6:
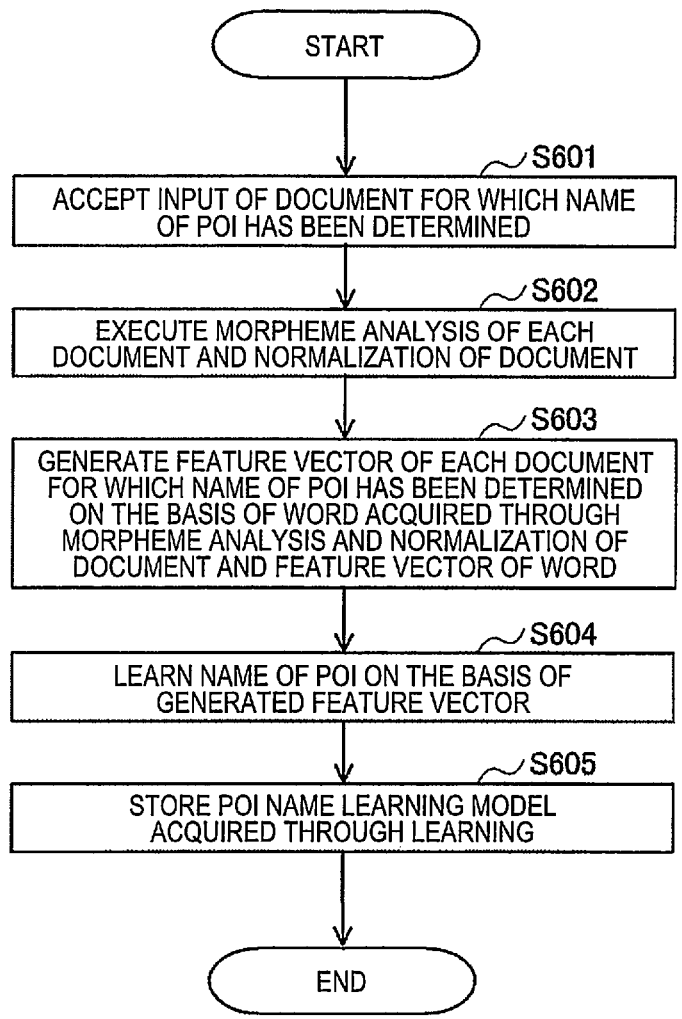
FIG. 6 is a flowchart illustrating a process of generating a POI name learning model.

FIG. 6 is a flowchart illustrating the flow of a process of generating a POI name learning model 143 using the search device 100.

The reception unit 102 of the search device 100 receives documents for which names of POI has been determined, in other words, accepts an input of teacher data for which names of POI have been determined (Step S601). The reception unit 102 transmits the accepted document to the CPU 105.

The CPU 105 executes a morpheme analysis and normalization of a document for the delivered document (Step S602).

The CPU 105 generates a feature vector of each document for which a name of POI has been determined using words acquired through the morpheme analysis and the normalization of the document and the word feature vector model 144 (Step S603). The CPU 105, for example, generates a feature vector of each document for which a name of POI has been determined using a fast text.

The CPU 105 learns a determination of names of POI using the generated feature vectors (Step S604). The learning of a determination of names of POI, for example, can be performed using a random forest.

The CPU 105 stores the POI name learning model 143 acquired through the learning in the storage unit 104 (Step S605), and the process ends.

As above, various learning models can be generated in accordance with the flowcharts illustrated in FIGS. 3 to 6. Since the POI presence/absence learning model 141, the POI state learning model 142, and the POI name learning model 143 use random forests for the generation thereof, they can be regarded as a set of a plurality of models.

Figure 7:
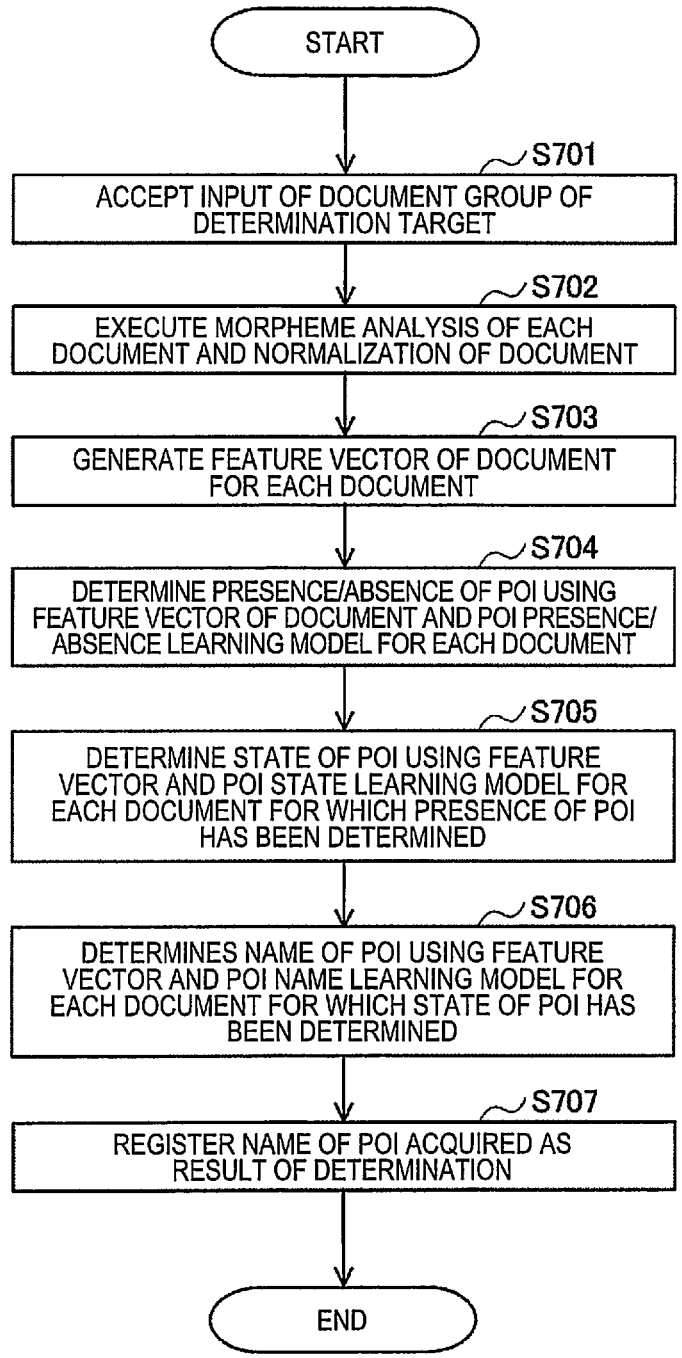
FIG. 7 is a flowchart illustrating a process of determining names of POI.

FIG. 7 is a flowchart illustrating the flow of a process of determining a document for which a name of POI has not been determined. In other words, FIG. 7 is a process of determining whether a name of POI is included in various kinds of information collected by the search device 100 and identifying the name when the name is included.

As illustrated in FIG. 7, the reception unit 102 of the search device 100 receives a document group (first document group) that is a determination target. In other words, the reception unit 102 accepts an input of a document for which a name of POI has not been determined as a document that is a determination target (Step S701). The reception unit 102 transmits the accepted document group that is a determination target to the CPU 105. The document group that is a determination target received by the reception unit 102, for example, may be a document group (data) from one of various media such as TWITTER (registered trademark), Blog, and Netnews as long as it is data having a likelihood of description relating to names of various POI being included. For this reason, the search device 100 may include an acquisition unit that randomly collects data that is open on a network and inputs the data as a document group that is a determination target.

The CPU 105 executes a morpheme analysis and normalization of each document included in a document group (first document group) that is a determination target delivered from the reception unit 102 (Step S702).

Thereafter, for each document, the CPU 105 generates a feature vector of the document using a fast text (Step S703).

Then, the CPU determines the presence/absence of information relating to POI for each document using a random forest using the generated feature vectors and the POI presence/absence learning model 141 (Step S704). In other words, for each document of the first document group, the CPU determines the presence/absence of POI by performing a determination using each model configuring the POI presence/absence learning model 141 using a feature vector generated for the document as an input. For a document for which the presence of POI has been determined, the document is stored in the storage unit 104 as a document (second document group) provided with a POI presence/absence determination label to which the label indicating that a POI is present is assigned. On the other hand, for a document for which the absence of POI has been determined, the document may be stored in the storage unit 104 as a document provided with a POI presence/absence determination label to which a label indicating that there is no POI is assigned.

After determining the presence/absence of POI, the CPU 105 determines a state of POI using the feature vector and the POI state learning model 142 for such a document (second document group) provided with a POI presence/absence determination label (Step S705). In other words, for each document of the second document group, a state of POI is determined by performing determination using each model configuring the POI state learning model 142 using the feature vector generated for the document as an input. The document for which the state of POI has been determined is stored in the storage unit 104 as a document (third document group) provided with a POI state determination label to which a label indicating details of the state of the POI is assigned. A document for which it is determined that there is no information of the state of POI may be stored in the storage unit 104 as a document provided with a POI state determination label to which a label indicating that there is no information for the state of POI is assigned. The assignment of a label relating to the state of POI, for example, represents that information of details such as "opening", "moving", or "closing" is assigned.

Then, for the document provided with the POI state determination label (third document group), the CPU 105 identifies a name of POI using the feature vector thereof and the POI name learning model 143 (Step S706). The CPU 105 registers the name of the POI acquired as a result of the determination in the map information (Step S707), and the process ends.

Although the identified name of POI is described to be registered in the map information, it may be stored in the storage unit 104, or information of the POI may be output to an external device, for example, a display or the like, through the output unit 103 and be checked by an operator. In addition, registration is not limited to the name of POI in the map information, and information relating to the POI such as the state of the identified POI may be registered together.

Thus, according to the search device 100 of this example, first, when the name of a POI is identified in advance, it is determined whether information of the POI is included in each document of a document group that is a determination target in the first place. A document for which it is determined that the information of the POI is not included is excluded. In addition, it is determined whether information relating to a state of the POI is included. A document in which information relating to the state of the POI is not included is excluded. After screening documents that are determination targets in two stages in that way, in other words, for a document determined to include information relating to the POI and determined to include information of the state of the POI, the name of the POI is identified. By screening using items relating to the POI twice in advance, determination of identifying the name of the POI is performed after a likelihood that a name of the POI is included in a document that is a determination target is increased and, accordingly, the name of the POI can be identified with a higher accuracy than that of a conventional device. In addition, by assigning a label relating to the state, materials for determining whether to register the POI in the map information or whether to delete the POI from the map information can be provided for an operator.

Supplement

It is apparent that the search device described above is not limited to the example described above and may be realized using another technique. Hereinafter, various modified examples will be described.

(1) In the example described above, although a method of identifying a name of a POI has been described, a search target of the search device illustrated in the example described above is not limited to a name of a POI. Information that is desired to be finally identified by the search device 100 (a name of a POI in the example described above) may be any kind of information and, for example, may be a person's name, an organization name, a touring site name or the like and, the search device may perform a process of searching (extracting) specific information from a large quantity of data.

For example, for a person's name, a model having learned the presence/absence of a person's name is generated instead of the POI presence/absence learning model, a model having learned persons' states (for example, external appearances, behaviors, tastes or the like characterizing persons) is generated instead of the POI state learning model, and a model having learned persons' names is generated. Then, for a document group (first document group) that is a determination target, first, documents (second document group) including persons' names are identified using the model having learned the presence/absence of persons' names and, additionally, persons' states are determined using the model having learned persons' states. Then, finally, persons' names are identified from documents (third document group) for which the persons' states were able to be determined using the model having learned persons' names.

In addition, for example, for an organization name, a model having learned the presence/absence of organization names is generated instead of the POI presence/absence learning model, a model having learned states of organizations (for example, reputations characterizing organizations, businesses of organizations and the like) is generated instead of the POI state learning model, and a model having learned organization names is generated. Then, for a document group (first document group) that is a determination target, first, documents (second document group) including organization names are identified using the model having learned presence/absence of organization names and, additionally, states of the organizations are determined using the model having learned states of organizations. Then, finally, organization names are identified from documents (third document group) for which states of organizations were able to be determined using the model having learned the names of organizations.

In this way, when specific information is extracted, first, the search device 100 performs screening in two stages using other items relating to the specific information, whereby the accuracy of extraction of specific information can be improved. In addition, according to the search device 100, an operator does not need to prepare a dedicated dictionary in advance and, accordingly, the effort of the operator can be alleviated.

Figure 8:
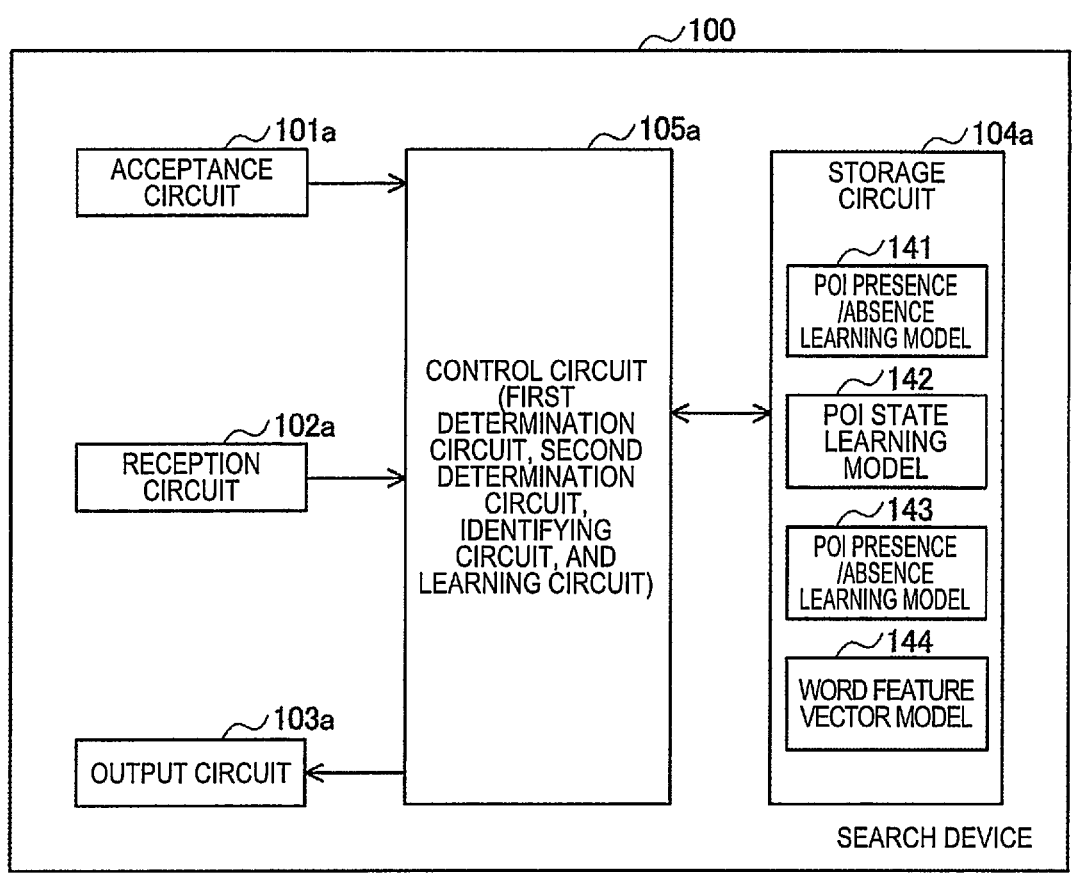
FIG. 8 is a block diagram illustrating another configuration example of a search device.

(2) In the example described above, as a technique for searching a name of a POI from a document in the search device, although searching is performed by a processor of the search device executing a search program or the like, this may be realized by logic circuits (hardware) or a dedicated circuit formed in an integrated circuit (IC) chip, a large scale integration (LSI) or the like in the device. In addition, such a circuit may be realized by one or a plurality of integrated circuits, and the functions of a plurality of functional units represented in the example described above may be realized by one integrated circuit. The LSI may be called as a VLSI, a super LSI, an ultra LSI or the like depending on the degree of integration. In other words, as illustrated in FIG. 8, the search device 100 may be composed of an acceptance circuit 101a, a reception circuit 102a, an output circuit 103a, a storage circuit 104a, and a control circuit 105a, the circuits respectively correspond to the acceptance unit 101, the reception unit 102, the output unit 103, the storage unit 104, and the CPU 105.

In addition, the search program described above may be recorded on a storage medium that can be read by a processor and, as the recording medium, "a medium of a non-transitory type", for example, a tape, a disk, a card, a semiconductor memory, a programmable logic circuit or the like can be used. Furthermore, the search program described above may be supplied to the processor described above through an arbitrary transmission medium (a communication network, broadcast waves or the like) that can transmit the search program. In other words, for example, a configuration in which a search program is downloaded from a network using an information processing device such as a smartphone, and the downloaded program is executed may be employed. Our devices and methods may be realized also in the form of data signals embedded in a carrier wave in which the search program is realized through electronic transmission.

In addition, the search program, for example, may be implemented using a script language such as Action Script or JAVASCRIPT (registered trademark), an object-oriented programming language such as Objective-C, JAVA (registered trademark), or C++, a markup language such as HTML5 or the like.

(3) Various examples represented in the example described above and various examples represented in "Supplement" may be appropriately combined. In addition, operations represented in each flowchart may be interchanged in the execution order or may be performed in a parallel manner when there is no contradiction as a result.

What is claimed is:

1. A search device comprising:
   a storage unit that stores a Point(s) of Interest (POI) presence/absence learning model having learned contexts relating to presence/absence of POI, a POI state learning model having learned contexts relating to states of POI, and a POI name learning model having learned features relating to names of POI;
   an acceptance device that accepts a first document group that is a determination target; and
   a central processing unit that:
   determines presence/absence of information relating to POI using the POI presence/absence learning model for each document of the first document group;
   determines information relating to states of POI using the POI state learning model for each document of a second document group for which it is determined by the central processing unit that a POI is present in the first document group; and
   identifies a name of a POI using the POI name learning model from each document of a third document group for which information relating to states of POI is determined by the central processing unit in the second document group, wherein each document in the third document group is a document having been screened in two stages in an order of determining presence/absence of information relating to POI and determining information relating to states of POI.

2. The search device according to claim 1, wherein the POI presence/absence learning model is generated based on a word feature vector model generated from documents used for learning features of words and a plurality of document groups for which the presence/absence of POI has been determined.

3. The search device according to claim 2, wherein the POI presence/absence learning model has learned determination of the presence/absence of POI using a predetermined algorithm based on feature vectors of documents extracted from a plurality of document groups for which the presence/absence of POI has been determined and feature vectors represented in the word feature vector model.

4. The search device according to claim 2, wherein the POI state learning model is generated based on the word feature vector model and a plurality of document groups for which information relating to states of POI has been determined.

5. The search device according to claim 4, wherein the POI state learning model has learned determination of information relating to states of POI using a predetermined algorithm based on feature vectors of documents extracted from a plurality of document groups for which the information relating to states of POI has been determined and feature vectors represented in the word feature vector model.

6. The search device according to claim 2, wherein the POI name learning model is generated based on the word feature vector model and a plurality of document groups for which names of POI have been identified.

7. The search device according to claim 6, wherein the POI name learning model has learned identification of names of POI using a predetermined algorithm based on feature vectors of documents extracted from a plurality of document groups for which names of POI have been determined and feature vectors represented in the word feature vector model.

8. A search method executed using a computer able to access a storage unit storing a Point(s) of Interest (POI) presence/absence learning model having learned contexts relating to presence/absence of POI, a POI state learning model having learned contexts relating to states of POI, and a POI name learning model having learned features relating to names of POI, the search method comprising:
   an accepting step of accepting a first document group that is a determination target;

a first determination step of determining presence/absence of information relating to POI using the POI presence/absence learning model for each document of the first document group;

a second determination step of determining information relating to states of POI using the POI state learning model for each document of a second document group for which it is determined in the first determination step that a POI is present in the first document group; and an identifying step of identifying a name of a POI using the POI name learning model from each document of a third document group for which information relating to states of POI is determined in the second determination step in the second document group, wherein each document in the third document group is a document having been screened in two stages in an order of determining presence/absence of information relating to POI and determining information relating to states of POI.

9. The search method according to claim 8, wherein the POI presence/absence learning model is generated based on a word feature vector model generated from documents used for learning features of words and a plurality of document groups for which the presence/absence of POI has been determined.

10. The search method according to claim 9, wherein the POI presence/absence learning model has learned determination of the presence/absence of POI using a predetermined algorithm based on feature vectors of documents extracted from a plurality of document groups for which the presence/absence of POI has been determined and feature vectors represented in the word feature vector model.

11. The search method according to claim 9, wherein the POI state learning model is generated based on the word feature vector model and a plurality of document groups for which information relating to states of POI has been determined.

12. The search method according to claim 11, wherein the POI state learning model has learned determination of information relating to states of POI using a predetermined algorithm based on feature vectors of documents extracted from a plurality of document groups for which the information relating to states of POI has been determined and feature vectors represented in the word feature vector model.

13. The search method according to claim 9, wherein the POI name learning model is generated based on the word feature vector model and a plurality of document groups for which names of POI have been identified.

14. The search method according to claim 13, wherein the POI name learning model has learned identification of names of POI using a predetermined algorithm based on feature vectors of documents extracted from a plurality of document groups for which names of POI have been determined and feature vectors represented in the word feature vector model.

15. A non-transitory computer readable medium comprising a search program that causes a computer able to access a storage function of storing a Point(s) of Interest (POI) presence/absence learning model having learned contexts relating to presence/absence of POI, a POI state learning model having learned contexts relating to states of POI, and a POI name learning model having learned features relating to names of POI to execute:

an acceptance function of accepting a first document group that is a determination target;

a first determination function of determining presence/absence of information relating to POI using the POI presence/absence learning model for each document of the first document group;

a second determination function of determining information relating to states of POI using the POI state learning model for each document of a second document group for which it is determined by the first determination step that a POI is present in the first document group; and an identifying function of identifying a name of a POI using the POI name learning model from each document of a third document group for which information relating to states of POI is determined by the second determination step in the second document group, wherein each document in the third document group is a document having been screened in two stages in an order of determining presence/absence of information relating to POI and determining information relating to states of POI.

16. The search program according to claim 15, wherein the POI presence/absence learning model is generated based on a word feature vector model generated from documents used for learning features of words and a plurality of document groups for which the presence/absence of POI has been determined.

17. The search program according to claim 16, wherein the POI presence/absence learning model has learned determination of the presence/absence of POI using a predetermined algorithm based on feature vectors of documents extracted from a plurality of document groups for which the presence/absence of POI has been determined and feature vectors represented in the word feature vector model.

18. The search program according to claim 16, wherein the POI state learning model is generated based on the word feature vector model and a plurality of document groups for which information relating to states of POI has been determined.

19. The search program according to claim 18, wherein the POI state learning model has learned determination of information relating to states of POI using a predetermined algorithm based on feature vectors of documents extracted from a plurality of document groups for which the information relating to states of POI has been determined and feature vectors represented in the word feature vector model.

20. The search program according to claim 16, wherein the POI name learning model is generated based on the word feature vector model and a plurality of document groups for which names of POI have been identified.

21. The search program according to claim 20, wherein the POI name learning model has learned identification of names of POI using a predetermined algorithm based on feature vectors of documents extracted from a plurality of document groups for which names of POI have been determined and feature vectors represented in the word feature vector model.

22. A non-transitory computer-readable recording medium having the search program according to claim 15 recorded thereon.

* * * * *